US010515387B2

(12) United States Patent
Roetter (10) Patent No.: US 10,515,387 B2
(45) Date of Patent: *Dec. 24, 2019

(54) SYSTEMS AND METHODS FOR DETERMINING USER ACTIONS

(71) Applicant: Google Inc., Mountain View, CA (US)

(72) Inventor: Alex Roetter, Mountain View, CA (US)

(73) Assignee: Google LLC, Mountain View, CA (US)

(*) Notice: Subject to any disclaimer, the term of this patent is extended or adjusted under 35 U.S.C. 154(b) by 1492 days.

This patent is subject to a terminal disclaimer.

(21) Appl. No.: 14/255,533

(22) Filed: Apr. 17, 2014

(65) Prior Publication Data

US 2015/0206178 A1 Jul. 23, 2015

Related U.S. Application Data

(63) Continuation of application No. 10/923,034, filed on Aug. 23, 2004, now Pat. No. 8,706,551, which is a continuation-in-part of application No. 10/653,899, filed on Sep. 4, 2003, now abandoned.

(51) Int. Cl.
*G06Q 30/00* (2012.01)
*G06Q 30/02* (2012.01)
*H04L 29/08* (2006.01)

(52) U.S. Cl.
CPC ......... *G06Q 30/0246* (2013.01); *G06Q 30/02* (2013.01); *G06Q 30/0241* (2013.01); *G06Q 30/0242* (2013.01); *G06Q 30/0248* (2013.01); *G06Q 30/0277* (2013.01); *H04L 67/20* (2013.01); *H04L 67/22* (2013.01)

(58) Field of Classification Search
CPC ................ G06Q 30/0207; G06Q 30/0277

USPC .............................. 705/14.1–14.73
See application file for complete search history.

(56) References Cited

U.S. PATENT DOCUMENTS

| | | | |
|---|---|---|---|
| 5,930,772 A | 7/1999 | Gomyo et al. | |
| 5,948,061 A | 9/1999 | Merriman et al. | |
| 6,006,197 A | 12/1999 | D'Eon et al. | |
| 6,016,504 A | 1/2000 | Arnold et al. | |
| 6,134,532 A | 10/2000 | Lazarus et al. | |
| 6,285,999 B1 | 9/2001 | Page | |
| 6,421,675 B1 | 7/2002 | Ryan et al. | |
| 6,928,426 B2 | 8/2005 | Dake | |
| 7,383,377 B2 | 6/2008 | Arataki et al. | |
| 2002/0004733 A1 | 1/2002 | Addante | |
| 2002/0016717 A1 | 2/2002 | Ponzio, Jr. | |
| 2002/0040318 A1 | 4/2002 | Amano et al. | |

(Continued)

FOREIGN PATENT DOCUMENTS

| | | |
|---|---|---|
| EP | 1 083 504 A2 | 3/2001 |
| KR | 19990053067 | 7/1999 |

(Continued)

OTHER PUBLICATIONS

CA Office Action for CA Application No. 2,561,779, dated Oct. 30, 2014, 3 pages.

(Continued)

*Primary Examiner* — Michael Bekerman
(74) *Attorney, Agent, or Firm* — Foley & Lardner LLP (57) ABSTRACT

A method for tracking user actions associated with an advertisement includes receiving conversion information. The method also includes determining whether the conversion information represents a valid conversion corresponding to a user action.

17 Claims, 7 Drawing Sheets

(56) References Cited

U.S. PATENT DOCUMENTS

| | | |
|---|---|---|
| 2002/0078192 A1 | 6/2002 | Kopsell et al. |
| 2002/0103698 A1 | 8/2002 | Cantrell |
| 2003/0014304 A1 | 1/2003 | Calvert et al. |
| 2003/0109249 A1 | 6/2003 | Frantz |
| 2003/0195837 A1 | 10/2003 | Kostic et al. |
| 2004/0044571 A1 | 3/2004 | Bronnimann et al. |
| 2004/0059708 A1 | 3/2004 | Dean et al. |
| 2004/0153367 A1 | 8/2004 | Lapstun et al. |
| 2004/0215515 A1 | 10/2004 | Perry |
| 2005/0006466 A1 | 1/2005 | Overhultz et al. |
| 2005/0055269 A1 | 3/2005 | Roetter et al. |
| 2005/0097040 A1 | 5/2005 | Chen et al. |
| 2005/0160002 A1 | 7/2005 | Roetter et al. |
| 2005/0273388 A1 | 12/2005 | Roetter |
| 2006/0031117 A1 | 2/2006 | Zohar et al. |
| 2006/0116924 A1 | 6/2006 | Angles et al. |
| 2006/0149641 A1 | 7/2006 | Loeb et al. |
| 2007/0033104 A1 | 2/2007 | Collins et al. |
| 2007/0131177 A1 | 6/2007 | Perkitny |
| 2007/0260516 A1 | 11/2007 | Schoen et al. |
| 2008/0010112 A1 | 1/2008 | Kniaz et al. |
| 2008/0010143 A1 | 1/2008 | Kniaz et al. |
| 2008/0065474 A1 | 3/2008 | Sharma et al. |
| 2008/0255915 A1 | 10/2008 | Collins et al. |

FOREIGN PATENT DOCUMENTS

| | | |
|---|---|---|
| KR | 20000030679 A | 6/2000 |
| KR | 20030043827 A | 6/2003 |
| WO | WO-99/54828 | 10/1999 |
| WO | WO-01/09789 | 2/2001 |
| WO | WO-01/39023 | 5/2001 |
| WO | WO-01/41030 | 6/2001 |
| WO | WO-03/050744 | 6/2003 |
| WO | WO-2004/084097 | 9/2004 |

OTHER PUBLICATIONS

Brin et al., "The Anatomy of a Large-Scale Hypertextual Search Engine," Seventh International World Wide Web Conference, Brisbane, Australia, Apr. 14-18, 1998, 20 pages.
Canadian Office Action for Application No. CA 2,578,410, dated Jul. 22, 2013, 4 pages.
Copending U.S. Appl. No. 11/520,351, filed Sep. 12, 2006, Abhinay Sharma et al., "Secure Conversion Tracking," 33 pages.
U.S. Appl. No. 10/653,899 filed by Roetter et al. on Sep. 4, 2003, "Systems and Methods for Determining User Actions," 41 pages.
U.S. Appl. No. 10/813,356 filed by Roetter et al. on Mar. 31, 2004, "Systems and Methods for Determining User Actions," 76 pages.
EP Official Communication on EP 05733817.0 dated May 2, 2013, 5 pages.
International Search Report/Written Opinion for PCT Application No. PCT/US2007/71950, dated Nov. 21, 2008, 3 pages.
International Search Report for PCT/US2005/010866, dated Aug. 1, 2007, 4 pages.
International Search Report/Written Opinion for PCT Application No. PCT/US2007/78200, dated Feb. 26, 2008, 3 pages.
Kristol et al., "RFC2109—HTTP State Management Mechanism," Feb. 1997,http://www.faqs.org/rfcs/rfc2109.html, 17 pages.
Supplemental European Search Report corresponding to EP 05 73 3817, dated Jul. 23, 2008, 4 pages.
U.S. Office Action on U.S. Appl. No. 11/477,134 dated Dec. 2, 2008, 9 pages.
U.S. Office Action on U.S. Appl. No. 11/477,134 dated Dec. 3, 2009, 18 pages.
U.S. Office Action on U.S. Appl. No. 11/477,134 dated May 27, 2009, 13 pages.
U.S. Office Action on U.S. Appl. No. 11/477,134 dated Jul. 2, 2010, 21 pages.
U.S. Notice of Allowance on U.S. Appl. No. 10/923,034 dated Dec. 9, 2013, 12 pages.
U.S. Office Action for U.S. Appl. No. 10/653,899, dated Oct. 6, 2009, 16 pages.
U.S. Office Action for U.S. Appl. No. 10/813,356, dated Mar. 8, 2011, 19 pages.
U.S. Office Action for U.S. Appl. No. 10/813,356, dated Oct. 5, 2011, 8 pages.
U.S. Office Action for U.S. Appl. No. 10/923,034, dated Nov. 23, 2011, 10 pages.
U.S. Office Action for U.S. Appl. No. 10/923,034, dated May 10, 2011, 20 pages.
U.S. Notice of Allowance on U.S. Appl. No. 10/923,034 dated Sep. 11, 2013, 11 pages.
CA Office Action on CA Patent Application No. 2,578,410 dated Jul. 31, 2014, 4 pages.
U.S. Office Action on U.S. Appl. No. 10/813,356 dated Oct. 3, 2014, 12 pages.
Canadian Office Action for CA Application No. 2,561,779 dated Nov. 27, 2015, 3 pages.
Chinese Office Action for CN Application No. 200580015719.1 dated Sep. 9, 2015, 18 pages.
EP Examination Report for EP Application No. 05 733817 dated Oct. 24, 2016, 8 pages.
U.S. Office Action for U.S. Appl. No. 10/813,356 dated Aug. 10, 2017, 12 pages.
U.S. Office Action for U.S. Appl. No. 10/813,356 dated Feb. 23, 2018, 12 pages.
U.S. Office Action for U.S. Appl. No. 18/813,356 dated Jun. 1, 2015, 9 pages.
U.S. Non-Final Office Action on U.S. Appl. No. 16/375,568 dated May 31, 2019 (8 pages.).
U.S. Non-Final Office Action on U.S. Appl. No. 10/653,899 dated Dec. 23, 2008 (16 pages).
Final Office Action on U.S. Appl. No. 16/375,568 dated Oct. 17, 2019 (9 pages).

SYSTEMS AND METHODS FOR DETERMINING USER ACTIONS

CROSS-REFERENCE TO RELATED PATENT APPLICATIONS

This application is a Continuation of U.S. application Ser. No. 10/923,034, filed Aug. 23, 2004, incorporated herein by reference in its entirety, which is a Continuation-In-Part of U.S. application Ser. No. 10/653,899, filed Sep. 4, 2003, incorporated herein by reference in its entirety.

BACKGROUND OF THE INVENTION

Systems and methods consistent with the principles of the invention relate generally to advertising and, more particularly, to identifying user actions associated with advertising.

Networks, such as the Internet, have become an increasingly important part of our everyday lives. Millions of people now access the Internet on a daily basis to shop for goods and services and obtain information of interest.

For example, suppose an individual wishes to purchase a printer via the Internet. The individual accesses the Internet and types in a vendor's uniform resource locator (URL). The individual may then access that vendor's home page to determine whether the vendor has the product that this individual wishes to purchase.

If the individual does not know which vendors sell printers, the individual may access a web site associated with a search engine. The individual enters the generic term "printer" into the search engine to attempt to locate a vendor that sells printers. Using a search engine in this manner to locate individual web sites that offer the desired product or service often results in a list of hundreds or even thousands of "hits," where each hit may correspond to a web page that relates to the search term.

In addition, the search engine may provide companies' advertisements relating to the product or service to which the individual is interested. For the example above, the search engine may provide advertisements for printers. The search engine may charge companies a predetermined fee each time the companies' advertisements are displayed to a user of the search engine. A more recent trend is to charge companies a fee each time their advertisement is selected by a user (i.e., each time a user clicks on the displayed advertisement).

Advertisers, however, are aware that not all clicks on their advertisements result in desired user actions or "conversions." A conversion may be defined by the advertiser and may represent, for example, a purchase, a registration, a page-view, etc. Advertisers, therefore, like to know the conversion rate associated with their advertisements being displayed to users. This allows the advertiser to maximize their return on investment (ROI) by reducing fees paid on non-profitable advertisements.

SUMMARY

In accordance with one aspect consistent with the principles of the invention, a method is provided that includes receiving conversion information. The method also includes determining whether the conversion information is associated with a valid conversion corresponding to a user action.

According to another aspect, a computer-readable medium that stores instructions executable by a processor is provided. The instructions cause the processor to perform a method that includes receiving conversion information potentially associated with an advertiser and determining whether the received conversion information is valid.

According to a further aspect, a server that includes a receive device and a processor is provided. The receive device receives information potentially associated with an advertiser. The processor determines whether the information resulted from an advertisement associated with the advertiser. The processor also determines whether the information is valid.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF THE PREFERRED EMBODIMENTS

The following detailed description of implementations consistent with the present invention refers to the accompanying drawings. The same reference numbers in different drawings may identify the same or similar elements. Also, the following detailed description does not limit the invention.

Systems and methods consistent with the principles of the invention perform conversion tracking associated with advertisers. The term "conversion," as used herein, may be defined by the advertiser and may represent a particular user action including, for example, a purchase, a registration, a sign-up, a page-view, a download, etc. The conversion tracking may be performed so that bogus conversions, such as those generated by a spammer, are not counted as conversions. In this manner, an advertiser may have a higher confidence that the number of conversions resulting from advertisements are actual conversions.

Exemplary Network

Figure 1:
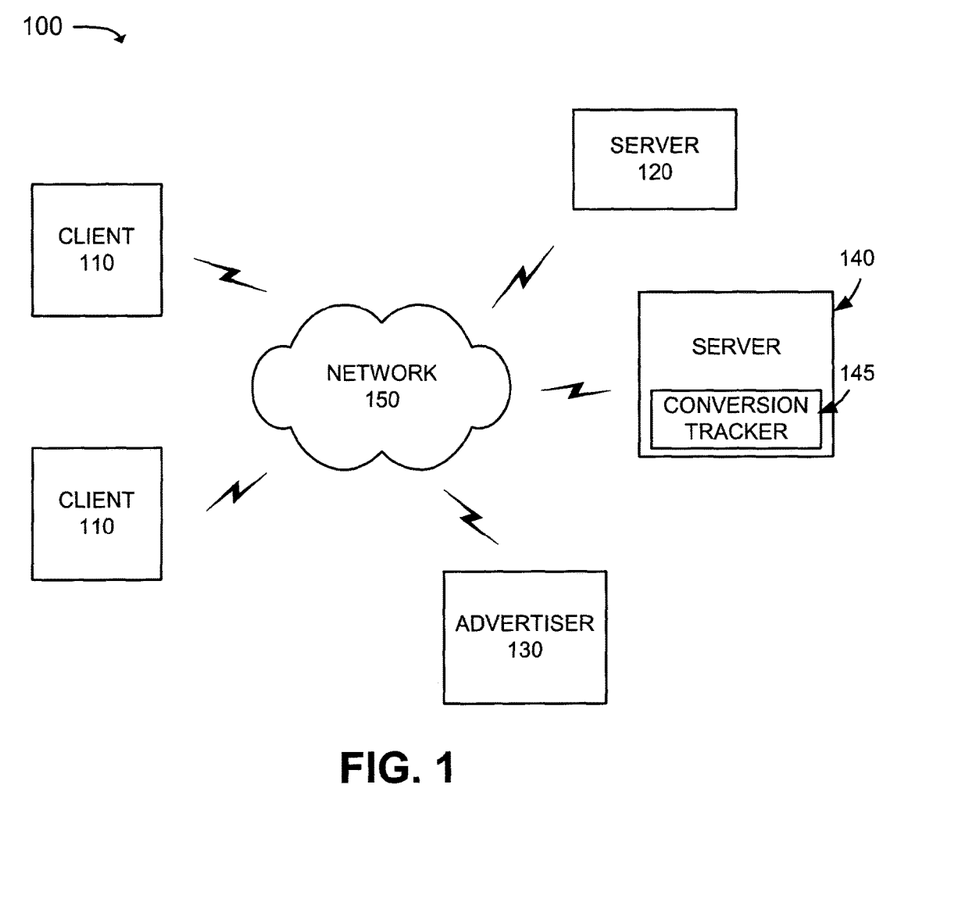
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include clients 110, servers 120 and 140 and advertiser 130 connected via network 150. Clients 110, server 120, advertiser 130 and server 140 may connect to network 150 via wired, wireless, or optical connections. Network 150 may include a local area network (LAN), a wide area network (WAN), a telephone network, such as the Public Switched Telephone Network (PSTN), an intranet, the Internet, a different type of network, or a combination of networks. Two clients 110, one server 120, one advertiser 130 and one server 140 have been illustrated as connected to network 150 in FIG. 1 for simplicity. In practice, there may be more or fewer clients, servers and advertisers. Also, in some instances, a client may perform the functions of a server and a server may perform the functions of a client. Additionally, in alternative implementations, the functions performed by one server may be combined with the functions performed by another server. For example, server 120 may perform the functions of both servers 120 and 140, or vice versa.

Clients 110 may include devices, such as personal computers, lap top computers, personal digital assistants (PDAs), wireless telephones, etc., threads or processes running on these devices, and/or objects executable by these devices. Server 120 may include one or more server devices, computer processors, threads, and/or objects that operate upon, search, maintain, and/or manage documents in a manner consistent with the principles of the invention.

Advertiser 130 may include one or more server devices/platforms that provide information, products and/or services to clients 110. For example, advertiser 130 may represent a vendor that sells goods/services over the Internet. Advertiser 130 may also pay for advertising associated with searches performed by server 120. For example, advertiser 130 may pay for advertising associated with one or more keywords. When server 120 receives a search query with the keyword (s), information associated with advertiser 130 may be displayed to the user with the search results.

Server 140, consistent with the present invention, may include one or more server devices, computer processors, threads, and/or objects that track conversion information associated with clients 110 and advertiser 130. In an exemplary implementation consistent with principles of the invention, server 140 may include a conversion tracker 145 that tracks conversions associated with clients 110 accessing information from advertiser 130.

Exemplary Server Architecture

Figure 2:
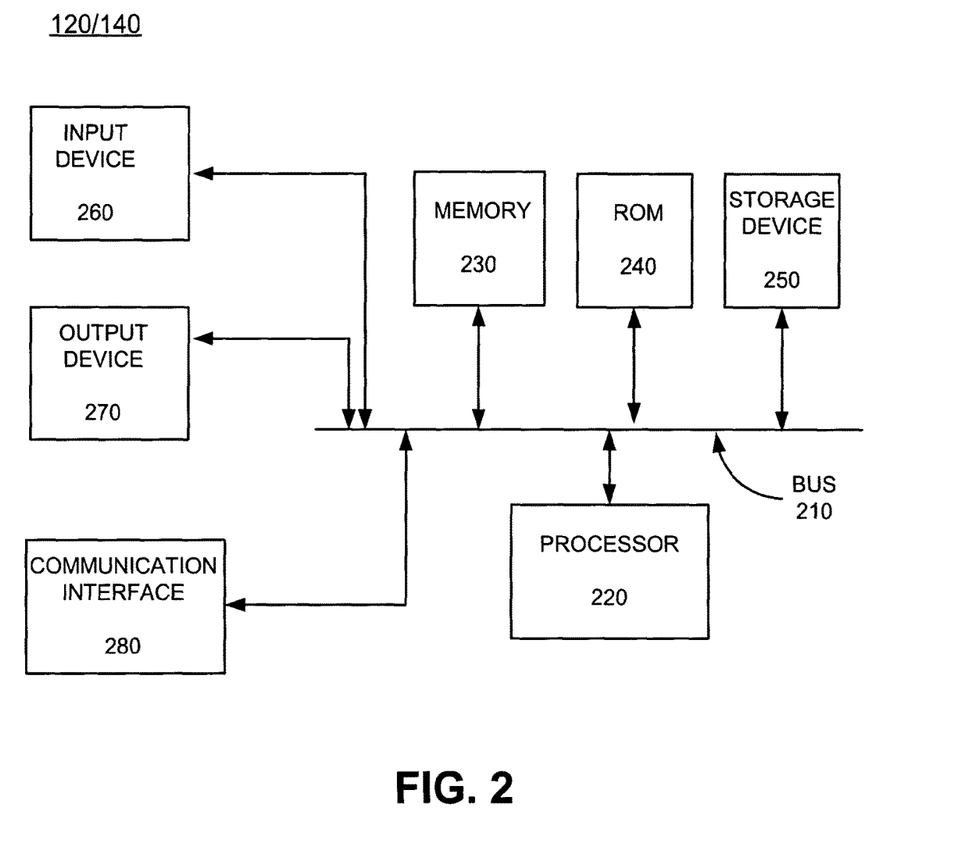
FIG. 2 is an exemplary diagram of a server in the network of FIG. 1 in an implementation consistent with the principles of the invention.

FIG. 2 is an exemplary diagram of server 120 in an implementation consistent with the principles of the invention. Server 140 may be configured in a similar manner. Server 120/140 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of server 120/140.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include one or more conventional mechanisms that permit a user to input information to server 120/140, such as a keyboard, a mouse, a pen, voice recognition and/or biometric mechanisms, etc. Output device 270 may include one or more conventional mechanisms that output information to the user, such as a display, a printer, a speaker, etc. Communication interface 280 may include any transceiver-like mechanism that enables server 120/140 to communicate with other devices and/or systems. For example, communication interface 280 may include mechanisms for communicating with another device or system via a network, such as network 150.

Server 120, consistent with the principles of the invention, may perform searches based on inputs from clients 110. Server 140, consistent with the principles of the invention, may perform conversion tracking associated with clients 110 interacting with advertiser 130. Server 120/140 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

In addition, server 120 and server 140 are illustrated in FIG. 1 as being single devices. Server 120 and server 140 may each be implemented as a network of computer processors and/or servers.

Figure 3:
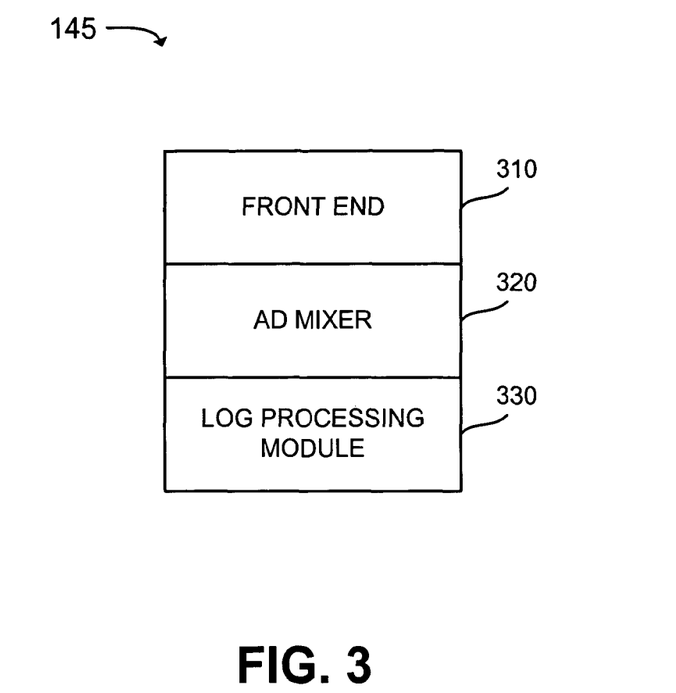
FIG. 3 is an exemplary functional block diagram of the conversion tracker of FIG. 1 according to an implementation consistent with the principles of the invention.

FIG. 3 is an exemplary functional block diagram of conversion tracker 145, according to an implementation consistent with the principles of the invention. The logical blocks illustrated in FIG. 3 may be implemented in software, hardware, or a combination of hardware and software. In addition, each of the functional blocks may represent one or more computer processors, threads, and/or objects that track and process user actions and generate conversion related information.

Conversion tracker 145 may include a front end (FE) 310, an ad mixer 320 and a log processing module 330. FE 310 acts as the front end of conversion tracker 145 to receive information associated with conversion tracking, such as ad click information, and generate cookies, as described in more detail below. For example, FE 310 may set and parse hypertext transfer protocol (HTTP) cookies associated with tracking user actions. Ad mixer 320 may receive ad click information and return information regarding the ad click to FE 310. Log processing module 330 may analyze ad click and conversion information and generate reports based on this information. Log processing module 330 may also determine whether a conversion is an actual or valid conversion and not a fake conversion (e.g., spam) or a duplicate conversion that has already been counted. It should also be understood that in alternative implementations, the functions performed by one of the logical blocks in FIG. 3 may be performed by another logical block. In addition, in alternative implementations, the logical blocks illustrated in FIG. 3 and other functions described below as being performed by conversion tracker 145 may be implemented in separate servers/platforms. Further, in alternative implementations, a single logical block/processing device may perform the functions of conversion tracker 145.

Exemplary Processing

Figure 4:
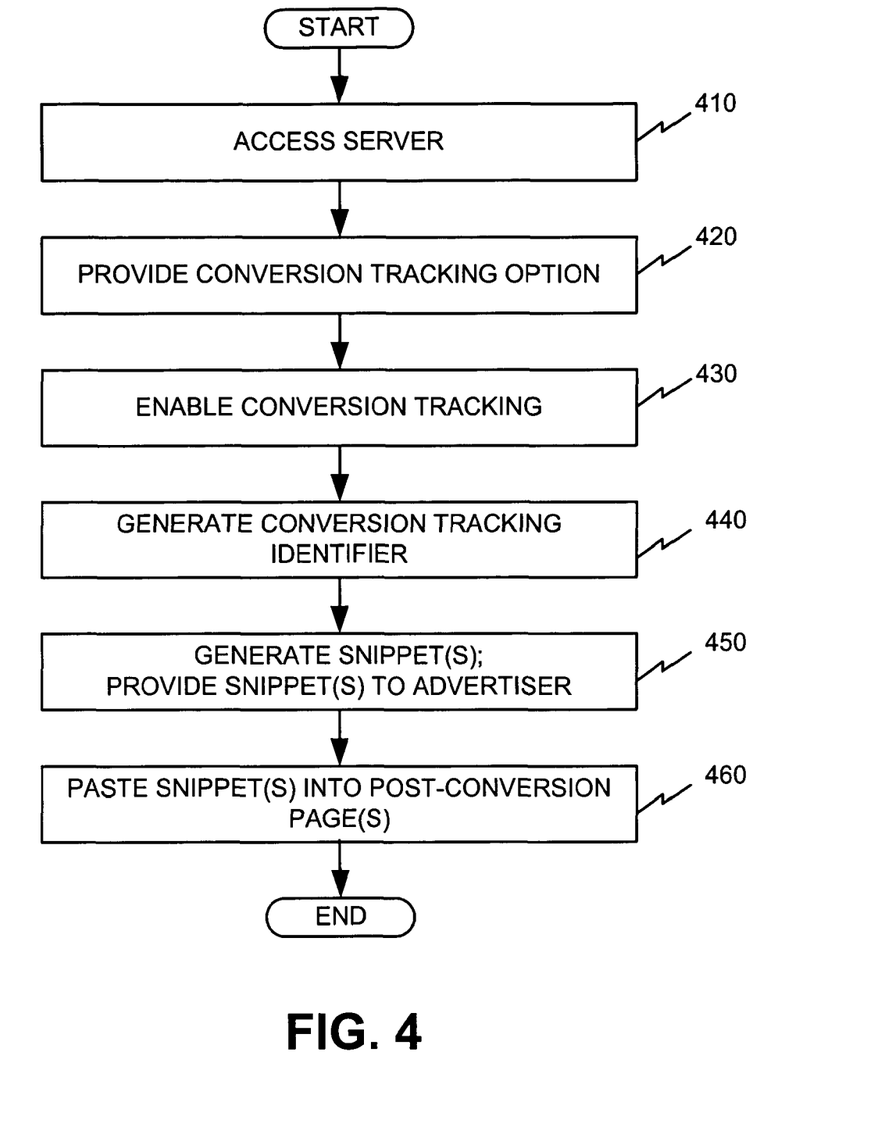
FIG. 4 is a flow diagram illustrating exemplary processing for enabling conversion tracking in an implementation consistent with the principles of the invention.

FIG. 4 is a flow diagram illustrating exemplary processing for enabling conversion tracking in an implementation consistent with the principles of the invention. The following description focuses on one or more servers that provide searching functions and paid advertisements. It will be appreciated that the techniques described herein are equally applicable to any server(s) that may provide advertisements for which fees are charged when the advertisements are selected by or presented to a user of a client device, such as client 110 in FIG. 1, and indeed to any system in which particular user actions are to be determined. For example, the techniques described herein are applicable to identifying user actions with respect to traditional banner advertisements, advertisements targeted based on the content or concepts in a document or page being provided to users, etc.

Processing may begin by an advertiser accessing server 120 (act 410). For example, advertiser 130 may connect to server 120 via network 150 by entering a uniform resource locator (URL) in a browser being executed by advertiser 130. Alternatively, an entity associated with advertiser 130 may connect to server 120 via a processing device/computer executing a conventional web browser. Server 120 may provide a user interface (UI) that includes a selection for advertisers that purchase advertising related to key words that may be input to the search engine executed by server 120. For example, as discussed above, advertiser 130 may represent an existing advertiser who has purchased one or more words/terms associated with computer queries/searches. Purchasing these words/terms may enable advertiser 130 to be featured when a search query entered by a user includes those words/terms. For example, advertiser 130 may be featured by an ad (whether in the form of a banner ad, text ad, pop-up or pop-under window, etc.) on a web page displayed to a client 110.

Assume that advertiser 130 clicks on (i.e., selects) the advertiser option. Server 120 may then provide a UI that includes a button/box that may be clicked or selected to enable conversion tracking for that advertiser (act 420). The conversion tracking option may allow an advertiser to individually enable conversion tracking for each account that the particular advertiser controls. For example, advertiser 130 may control multiple accounts. In this case, advertiser 130 may wish to enable conversion tracking for one or more of the accounts. Assume that advertiser 130 has a single account and enables conversion tracking for that account (act 430). When conversion tracking is enabled, server 140 will be able to track conversion rates with respect to ad clicks, ad impressions and other information, as described in more detail below. The term "ad impression" as used herein generally refers to the display of an advertisement to a client 110.

After conversion tracking is enabled, server 120 may generate a conversion tracking identifier (ID) associated with each account that has been selected for conversion tracking (act 440). The particular conversion tracking ID may be unique for each particular account. In the example above in which advertiser 130 enabled conversion tracking for a single account, server 120 may generate a single conversion tracking ID. In some implementations, the conversion tracking ID may correspond to advertiser 130's account ID. This conversion tracking ID enables server 120 to maintain privacy with respect to clients 110. For example, in implementations consistent with the principles of the invention, the conversion tracking ID is included in a cookie path associated with tracking ad clicks, as described in more detail below. This may limit the number of cookies being transmitted, thereby reducing privacy concerns associated with some users. In other implementations, a single conversion tracking ID may be used for all advertisers that have enabled conversion tracking or no conversion tracking ID may be used.

Note that the conversion tracking ID may not affect the level of granularity at which reports may be generated. For example, even if a single conversion tracking ID was used for all advertisers in the system, server 140 may still associate the ad click data with specific advertisers, campaigns, creatives, etc. This is because the cookies may include additional information regarding the ad clicks, such as advertiser specific information.

After conversion tracking is enabled and a conversion tracking ID has been assigned, server 120 generates a snippet, e.g., a piece of software code, that may be provided to advertiser 130 (act 450). In an exemplary implementation consistent with the present invention, the snippet may be a piece of hypertext markup language/JavaScript (HTML/JS) code that allows clients 110 and/or advertiser 130 to pass information to server 140, such as the value of a conversion and a label describing the type of conversion (e.g., a purchase, a registration, a page view, a download, etc.), after a conversion has occurred. In an exemplary implementation consistent with the present invention, the snippet may be an image request that is transmitted to server 140 after a conversion has occurred. An example of such an HTML snippet may be as follows: <img src="http://www.googleadservices.com/pagead/conversion/GHSnx87543x/conversion? value=123&label="Purchase"&format=120x60>

In this example, "googleadservices.com" represents server 140 and GHSnx87543x represents the conversion tracking ID assigned to the conversion tracking enabled account associated with advertiser 130. The conversion tracking ID included in the snippet may be used to determine whether client 110 will send a cookie to server 140 after a conversion occurs, as described in more detail below. "Value" and "label" may represent optional parameters that can be dynamically generated and appended to the HTML image request. The value parameter may represent an advertiser defined unit or value associated with a conversion specified in any units (e.g., dollars). If a particular advertiser has the same unit or value for each conversion, server 120 may include the actual unit/value in the snippet. For example, if each conversion is worth $10 to advertiser 130, the value field may specify the value of ten dollars. The label parameter may be a free form text label that can be assigned to differentiate types of conversions that may be used in a final report (e.g., "purchase," "registration," "mailing list signup," "page view," "download," etc.). The set of available labels may be predefined and any requests not included within the predefined list may be marked as an UnknownLabelType. The label parameter may also be set dynamically, per page, to advertiser specific custom labels. The format parameter defines the size of the post conversion page image that will be returned to advertiser 130 when a conversion is achieved, as described in more detail below.

Server 120 may also provide a JS wrapper and instructions to advertiser 130 that facilitate setting the value and label parameters and pasting the snippet into the appropriate page. For example, server 120 may provide a number of snippets that may be pasted into a number of advertiser pages. The JS wrapper may facilitate setting the values and labels in each snippet based on the particular item/product associated with the conversion. For example, if advertiser 130 sells only three products having prices of $50, $100 and $200, server 120 may provide three snippets and advertiser 130 may set the value in each snippet to the values $50, $100 and $200, respectively. Alternatively, server 120 may set the values in each snippet and also include the appropriate label for each snippet.

After server 120 provides advertiser 130 with the HTML/JS snippet(s), along with instructions associated with the snippet, advertiser 130 may paste the snippet(s) in the appropriate post conversion page(s) on advertiser 130's web site (act 460). As described previously, each advertiser may define what acts are considered conversions. When a client 110 performs such a predefined act, a conversion has taken place. For example, a purchase, a registration, a page view, a sign-up, a download, etc., may be considered a conversion. In each case, a post-conversion page provided by advertiser 130 may be displayed to client 110. For example, in the case of a purchase, advertiser 130 may provide a web page to client 110 after client 110 has transmitted a credit card number to advertiser 130 for purchasing a particular product. When advertiser 130 receives the credit card information, the purchase has been completed and advertiser 130 may provide a page that states "Your purchase has been completed. Your total charges are X." Such a page may represent a post-conversion page.

After advertiser 130 pastes the HTML/JS snippet(s) into the appropriate post conversion page(s), conversion tracking is enabled for advertiser 130. The process for conversion tracking may then commence in a manner that is transparent with respect to advertiser 130.

Figure 5:
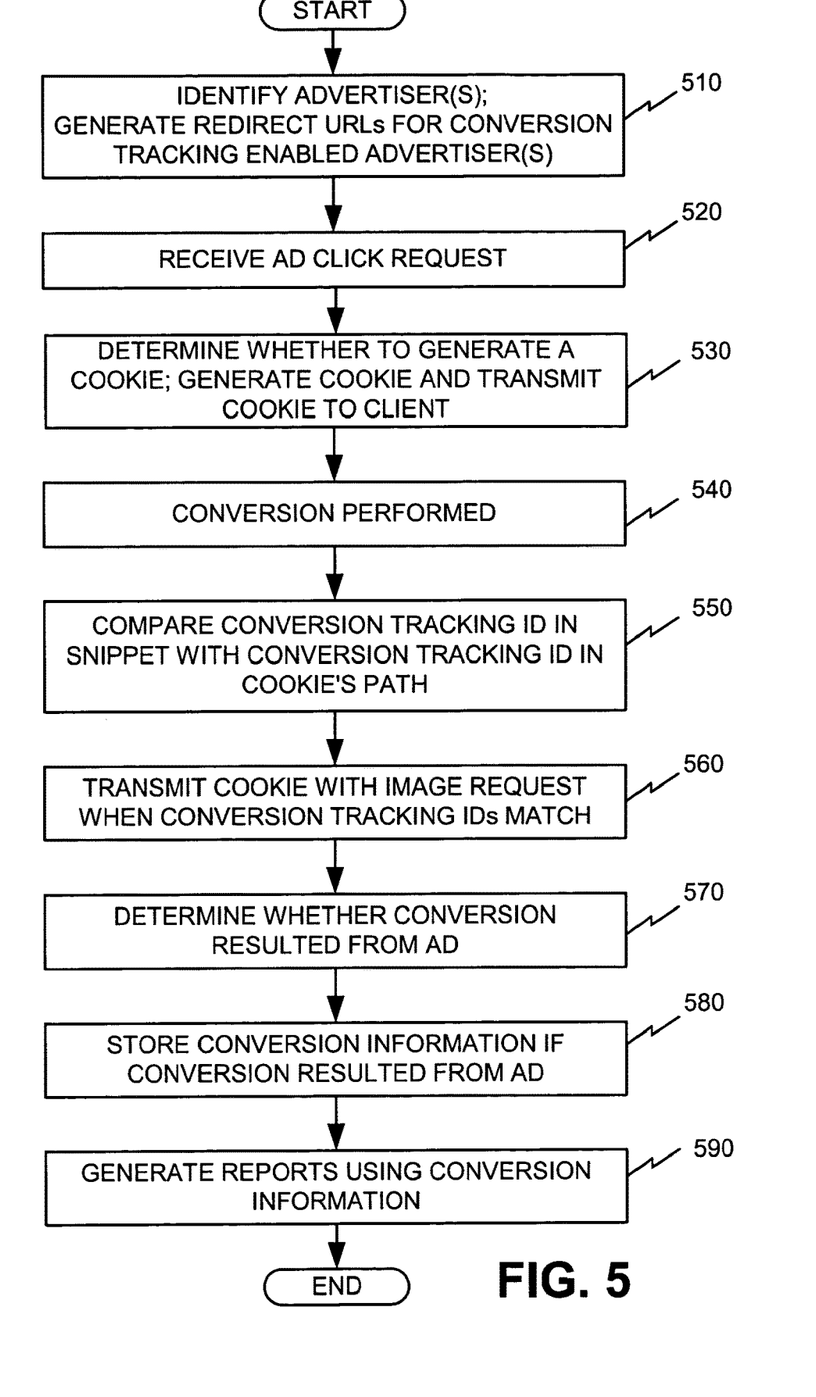
FIG. 5 is a flow diagram illustrating exemplary processing associated with conversion tracking in an implementation consistent with the principles of the invention.

FIG. 5 is a flow diagram illustrating exemplary processing associated with conversion tracking in an implementation consistent with the principles of the invention. The processing described below uses the example of conversion tracking associated with ads based on search queries. However, as discussed above, the techniques described herein may be used in any system in which particular user actions are to be determined/identified. Processing may begin with a client 110 accessing server 120 via network 150 and receiving a UI for entering a search query. Assume that the user enters a search query and transmits the search query to server 120. Server 120 receives the search query, executes the search and generates a list of search results.

Server 120 may also identify advertiser(s) based on the search query (act 510). For example, server 120 may store advertiser information in a memory, such as storage device 250 (FIG. 2). The advertiser information may include a database of key words and corresponding advertisers (along with their URLs) who have purchased advertising associated with the key words. When server 120 receives a query, server 120 searches the advertiser information to determine whether any advertiser has purchased advertising associated with one or more terms in the input query. Server 120 may then identify the advertiser(s) associated with the input query and the particular web site(s) associated with the respective advertiser(s). In one implementation, server 120 may also generate a redirect URL for each identified advertiser that has enabled conversion tracking so that the URL points to server 140 (act 510). For example, server 120 may generate a redirect URL associated with a conversion tracking enabled advertiser, such as:
http://www.googleadservices.com/pagead/adclick?adurl=http://www.advertiser.com/landingpage&sa=1

This redirect URL may point to googleadservices.com, which in this example, corresponds to server 140, and may indicate that the redirect is associated with an ad click on a page ad. The redirect URL may also point to the advertiser's landing page or home page (i.e., advertiser.com/landing-page). The presence of sa=1 in the exemplary URL above may be used by log processing module 330 to recognize this URL is associated with an ad click. Other information may also be included in the redirect URL.

After generating the redirect URL(s) for each conversion tracking enabled advertiser associated with the search query, server 120 transmits the search results and advertisement(s) to client 110 for display. Assume that a user, via client 110, performs an ad click on an ad associated with a conversion tracking enabled advertiser displayed on client 110. For example, assume that a web site associated with advertiser 130 is provided on the web page displayed on client 110 and that advertiser 130 has enabled conversion tracking. Further assume that the user, via client 110, clicks on the displayed ad associated with advertiser 130.

After client 110 selects the ad associated with advertiser 130, an ad click request is sent to server 140 as a result of the redirect URL generated at act 510 (act 520). For example, server 140 may receive an ad click HTTP request, such as:
http://www.googleadservices.com/pagead/adclick?url=http://www.advertiser.com/landingpage&sa=1

As discussed above, the redirect URL points to googleadservices.com, which in this example, corresponds to server 140. Conversion tracker 145 in server 140 receives the ad click request and directs client 110 to advertiser's 130 home page or landing page, which in this example may be http://www.advertiser.com/landing page. In an exemplary implementation, FE 310 may also store or log the ad click request and forward the ad click request to ad mixer 320. In some implementations consistent with the present invention, FE 310 may also redirect the request back to itself by, for example, rewriting sa=1 to sa=L. This may ensure that clicks by web crawlers are not counted in the number of ad clicks associated with an advertiser. For example, automated crawling software that does not follow HTTP redirects will never make a request for the URL where the field sa=1 has been rewritten to sa=L. This prevents spamming by automated crawlers that lack this redirect following feature.

Ad mixer 320 receives the ad click request and may log the ad click request. Ad mixer 320 and/or FE 310, may also analyze the ad click request to determine whether a cookie should be generated in response to the ad click (act 530). For example, cookies may be set for conversion tracking enabled advertisers. In the example above, since conversion tracking is enabled for advertiser 130, ad mixer 320 and/or FE 310 may determine that a cookie should be set. Ad mixer 320 may also identify the conversion tracking ID associated with advertiser 130, which will be included in the cookie path. In an exemplary implementation consistent with present invention, including the conversion tracking ID in the cookie path limits the number of cookies that will be sent to server 140, as described in more detail below.

Ad mixer 320 may further identify the approximate time that the ad click occurred and generate an ad click time stamp (TS). The TS may be a globally unique identifier that includes the time that ad mixer 320 received the ad click request. The TS may also include other information, such as server IP address/host processor ID, etc., to ensure that the TS is globally unique. Ad mixer 320 may then generate a message including the TS, a conversion tracking ID and a Boolean indicating whether a cookie should be set. If the ad click was not associated with a conversion tracking enabled advertiser, the Boolean will indicate that no cookie should be generated. Ad mixer 320 may forward this message to FE 310.

FE 310 receives the message from ad mixer 320 and determines whether a cookie is to be set. The cookie may represent a conversion tracking cookie associated with tracking conversions for an advertiser. Assume that the information from ad mixer 320 indicates that a cookie is to be set, FE 310 may then generate the conversion tracking cookie (act 530). In an exemplary implementation, the conversion tracking cookie may also include a click string (CS). The CS may represent the particular ad click(s) or action(s) performed by the user and may be used to track the user's actions. The conversion tracking cookie may also include the ad click TS and/or an expiration date associated with the cookie. The conversion tracking cookie's path may also include the conversion tracking ID of the conversion tracking enabled advertiser. FE 310 may send the cookie to client 110 along with the redirect URL pointing to advertiser 130's site (act 530). For example, server 140 may send an HTTP message to client 110 that includes the following information:

Set-Cookie: CONVERSION=CS=A6yIzdSDw-4-iX8pj0IqkRPRxTzfA1Kp6FA5xKXgACApTBAsmMEABCgpF:TS=1055812564745609; path=/pagead/conversion/GHSnx87543/; domain=.googleadservices.com; expires=Tue, 17-Jun-2003 01:02:03 GMT In the example above, the message indicates that a cookie identified as CONVERSION is to be set and that the cookie includes a CS. The message also includes a TS and an expiration date associated with the cookie. For example, the cookie may be set to expire 30 days from the time the cookie was created. This prevents old cookies from being used to incorrectly identify later conversions. Shorter or longer cookie expiration periods may also be used. In other implementations, the cookie may just include the TS identifying when the cookie was created. In this case, server 140 may determine whether the cookie has expired based on the TS.

In still other implementations, the cookie may not include an expiration date. In further implementations, the cookie may be a session cookie that may expire when the client's 110 browser closes.

The exemplary message above also includes a path for the cookie and a domain. The domain, googleadservices.com, corresponds to server 140 in this example. The cookie path in the example above is: pagead/conversion/GHSnx87543/. The field GHSnx87543 in the cookie path may represent the conversion tracking ID for advertiser 130. By including the conversion tracking ID in the cookie path, this cookie will not be forwarded to server 140 when ad clicks associated with other advertisers are performed. For example, in one implementation consistent with the present invention, client 110 will only send a cookie associated with a particular advertiser when client 110 performs what that particular conversion tracking enabled advertiser pre-defined to be a conversion, as described in more detail below. When client 110 clicks on impressions or performs conversions not associated with advertisers that have not enabled conversion tracking, no cookies will be sent by client 110. Reducing the number of times cookies are sent reduces the ability of server 140 to track user actions. This may reduce privacy concerns of privacy sensitive users. In other implementations consistent with the present invention in which privacy concerns are not as great, client 110 may send cookies associated with conversion tracking enabled advertisers when no conversions for those advertisers have occurred. In this manner, server 140 may identify more actions performed by users.

Client 110 receives the message indicating that the cookie is to be set and redirect URL from server 140. Client 110 may store the cookie and use the redirect URL to access advertiser 130's web site. Thereafter, additional user actions (e.g., conversions) associated with advertiser 130 may be transmitted to server 140 via the cookie.

Assume that client 110 performs an act defined by advertiser 130 to be a conversion for that particular advertiser (act 540). In this case, when client 110 performs the conversion, advertiser 130 downloads a post conversion page to client 110. As discussed above with respect to FIG. 4, the post conversion page includes the snippet (i.e., the HTML image request) provided to advertiser 130. As further discussed above, in one implementation, the snippet may include an image request. Advertiser 130 downloads the post conversion page to client 110. When client 110 receives and displays the post conversion page, client 110 executes the snippet. The snippet, as described previously with respect to FIG. 4, may include a conversion tracking ID associated with advertiser 130. When the snippet is executed, client 110 sends the image request to server 140. That is, client 110 executes the snippet and sends a post conversion image request to server 140. For example, the post conversion HTTP image request may include the following information:

http://www.googleadservices.com/pagead/conversion/GHSnx87543x/?value=123&label=Purchase&format=120x60.

This image request includes information indicating that a conversion occurred, the conversion tracking ID, a value, a label and a format for the image.

Client 110 may also compare the conversion tracking ID included in the snippet (GHSnx87543x in this example) with the conversion tracking ID in the stored cookie's path (act 550). That is, client 110 compares the conversion tracking ID included in the snippet on advertiser 130's post conversion page with the conversion tracking ID associated with the cookie received at act 530. When the conversion tracking IDs match, client 110 transmits the cookie, along with the post conversion image request, to server 140 (act 560). It should be understood that client 110 may receive a number of cookies from server 140 when client 110 performs ad clicks associated with various conversion tracking enabled advertisers in a manner similar to that discussed above with respect to advertiser 130. Therefore, client 110 may compare the conversion tracking ID in the post conversion snippet with the conversion tracking IDs included in the cookie path for each of the cookies stored on client 110. When the conversion tracking ID in the snippet matches any one of the conversion tracking IDs in a cookie path of a stored cookie, the client 110 will send that cookie to server 140. In some implementations consistent with the present invention, client 110 may also examine the TS, if a TS is included in the cookie, to determine whether to send the cookie to server 140. For example, if client 110 determines that the cookie has expired, client 110 may not send the cookie. Server 140, however, may also look at the TS, as described below.

Assuming that the conversion tracking ID in the snippet matches the cookie associated with advertiser 130 (and optionally, the TS indicates that the cookie has not expired), client 110 sends the cookie for advertiser 130 and the post conversion image request to server 140. When server 140 receives the image request, conversion tracker 145 examines the request and determines whether the conversion resulted from a paid advertisement (act 570). For example, server 140 may look to see whether the cookie with the unique conversion tracking ID associated with advertiser 130 has been received with the image request. The cookie may also include the CS as part of the cookie payload and the CS may identify the particular ad click(s) and/or action(s) performed by client 110. The cookie may also contain other data that may be used to correlate the click event with the conversion, e.g., when the click happened, the ad that was clicked on, etc.

If conversion tracker 145 does not find such a cookie included with the image request, FE 310 may determine that the conversion did not result from a paid advertisement. If FE 310 has received such a cookie with the image request, FE 310 may determine whether the cookie has expired based on the expiration date or TS information included with the cookie. Server 140 may store information associated with the conversion, such as the value, type, etc. (act 580). FE 310 may also return an image to client 110 that states, for example, "Thank you for shopping at a Google advertiser." Client 110 may then paste this image into the post conversion page displayed on client 110. Providing this image in the post conversion page allows clients 110 to be aware that some of their actions are being tracked. If FE 310 determines that the conversion did not result from a paid ad or that the cookie associated with the paid ad had expired, server 140 may not store the conversion information. Server 140 may also return a blank image or no image and client 110 will not receive any additional message on the post conversion page.

FE 310 may also log the received image request into a log, such as a binary formatted log. FE 310 may further send a message to ad mixer 320 indicating that the conversion occurred. Ad mixer 320 may also log the conversion event in an ad conversion log. The ad conversion log may include records, such as, a number of conversion events, a value associated with each conversion event, a label associated with each conversion event, a time associated with each conversion event, the search engine or ad network associated with each conversion event, etc. Log processing module 330 may access the ad conversion log and use the ad conversion data to populate a conversion events database. Log processing module 330 may then generate reports based on information in the conversion events database (act 590).

For example, log processing module 330 may generate a conversion ratio for a particular advertiser, such as advertiser 130. The conversion ratio may be based on the number of times a displayed ad associated with an advertiser 130 was clicked at least once divided by the number of conversions that resulted from the ad. By generating the conversion ratio, both advertisers and search engine providers may determine the effectiveness of the paid ads.

More detailed analysis of advertisements can also be made. For example, log processing module 330 may determine a total value of all conversions over a period of time for a particular advertiser that resulted from ads, a value per click, etc. Log processing module 330 may also determine a conversion ratio based on where the ad is displayed. That is, server 140 may store information indicating whether the paid ad was displayed at the top of a web page, as opposed to another location, such as the side of the web page, or the position of the ad in a ranked list. Log processing module 330 may then analyze a conversion ratio with respect to the location of the displayed ad.

Secure Conversion Tracking

As described above, conversion tracker 145 may track conversions based on a post conversion image request that is generated by a snippet that an advertiser pastes into a post conversion page. These snippets are essentially static, notwithstanding the conversion value and label fields. In some instances, a user associated with a client 110 may unintentionally (or intentionally) hit reload multiple times on client 110's browser when a conversion event is about to occur, such as when client 110 is transmitting credit card information to advertiser 130. This may result in the snippet being executed multiple times and multiple conversion events being received by conversion tracker 145.

Implementations consistent with principles of the invention perform secure conversion tracking by dynamically generating a snippet when a conversion occurs. The dynamically generated snippet may include information that is later checked by conversion tracker 145 to determine whether the conversion is a valid conversion and is not a fake conversion (e.g., spam) or a duplicate of a previously received conversion. In this manner, an advertiser may have a higher confidence that the conversions and conversion ratios determined by conversion tracker 145 are accurate.

Figure 6:
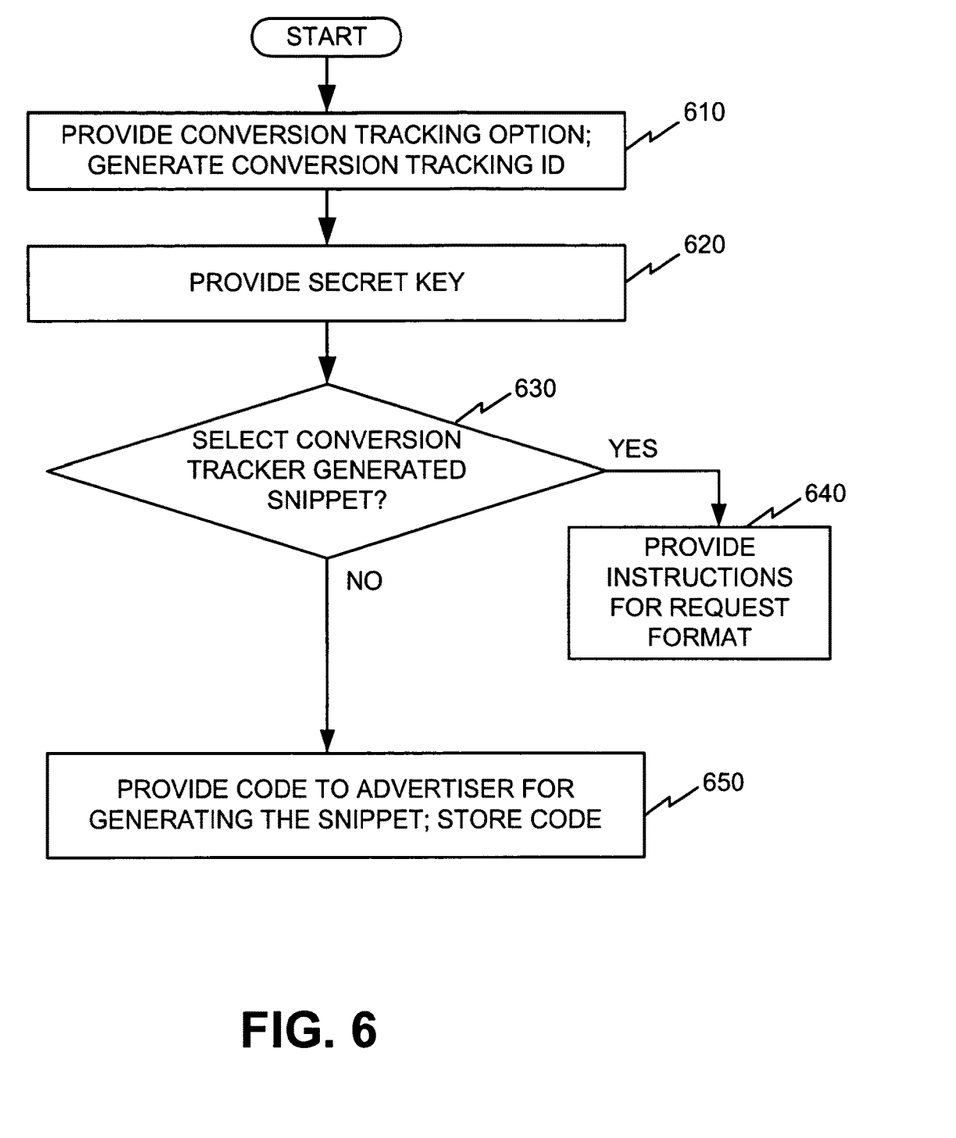
FIG. 6 is a flow diagram illustrating exemplary processing associated with secure conversion tracking in an implementation consistent with the principles of the invention.

FIG. 6 is a flow diagram illustrating exemplary processing associated with secure conversion tracking in an implementation consistent with the principles of the invention. Similar to the discussion above with respect to FIG. 4, the following description focuses on one or more servers that provide searching functions and paid advertisements, also referred to herein as ads. It will be appreciated that the techniques described herein are equally applicable to any server(s) that may provide ads for which fees are charged when the ads are selected by or presented to a user of a client device, such as client 110 in FIG. 1, and indeed to any system in which particular user actions are to be determined. For example, the techniques described herein are applicable to identifying user actions with respect to traditional banner ads, ads targeted based on the content or concepts in a document or page being provided to users, etc.

Processing may begin with an advertiser, such as advertiser 130, accessing server 120. For example, advertiser 130 or an entity associated with advertiser 130 may connect to server 120 via network 150 by entering an address associated with server 120. Assume that advertiser 130 has purchased advertising related to one or more words/terms associated with computer queries/searches performed by server 120. Purchasing these words/terms may enable advertiser 130 to be featured when a search query entered by a user into a search engine executed by server 120 includes those words/terms. For example, advertiser 130 may be featured by an ad (whether in the form of a banner ad, text ad, pop-up or pop-under window, etc.) on a web page provided by server 120 for display to a client 110.

Further assume that advertiser 130 would like to enable conversion tracking for the ads provided by server 120 to various clients 110. For example, advertiser 130 may wish to track conversion rates with respect to ad clicks, ad impressions and other information provided by server 120 to clients 110. Similar to the discussion above with respect to FIG. 4, a conversion tracking option may be provided to advertiser 130 (act 610). For example, server 120 may include a conversion tracking user interface (UI) that may be provided to advertiser 130. The conversion tracking UI may include a "Secure Tracking," link/icon. The Secure Tracking link/icon may include text that indicates that selecting this link/icon indicates that advertiser 130 would like to track conversions in a secure or spam-resistant manner.

Assume that advertiser 130 selects the Secure Tracking link/icon. As discussed above with respect to FIG. 4, an advertiser 130 may control multiple accounts and may wish to enable conversion tracking for one or more of the accounts. For simplicity, assume that advertiser 130 has a single account and wishes to enable secure conversion tracking for that account. Server 120 may generate, if necessary, a conversion tracking ID for advertiser 130 (act 610). In the event that advertiser 130 has already enabled conversion tracking for that account, as described above with respect to FIG. 4, and now only wishes to enable secure conversion tracking for that account, no additional conversion tracking ID needs to be provided. In other words, the same conversion tracking ID already assigned to advertiser 130 may be used for secure conversion tracking.

Server 120 may also provide an advertiser-specific secret key to advertiser 130 (act 620). The secret key may be an arbitrary string that is generated in a random or pseudorandom manner. The secret key may be known only to servers 120 and 140 and advertiser 130 and may be used to compute a hash value that may be used to verify that a conversion received by conversion tracker 145 is an actual conversion and is not spam (either intentional or unintentional), as described in more detail below. Server 120 may assign a sequence number of one to the initial secret key provided to advertiser 130. If advertiser 130 loses the secret key or the secret key is compromised, a new secret key may be provided with a next available sequence number (e.g., two, three, etc.). In alternative implementations, conversion tracker 145 may provide the secret key to advertiser 130 with software that may be used to generate a snippet when a conversion occurs, as described in more detail below.

Server 120 may also provide an option for advertiser 130 to select either "advertiser generated snippet" or "conversion tracker generated snippet." The options may include text that describes requirements associated with each option. For example, for advertiser generated snippet, the text may explain that advertiser 130 may be required to install some software on their web site that will be executed upon a conversion event. For conversion tracker generated snippet, the text may explain that no software needs to be installed, but that advertiser 130 may be required to send hyptertext transfer protocol secure (HTTPS) requests to server 140 upon a conversion event. In other implementations, the ability to send HTTPS requests may not be required for the conversion tracker generated snippet option and HTTP requests may be used.

Assume that the user selects conversion tracker generated snippet (act 630). In this case, server 120 may provide instructions to advertiser 130 regarding requesting a snippet when a conversion occurs (act 640). For example, server 120 may instruct advertiser 130 to generate an HTTPS request to conversion tracker 145 (e.g., www.googleadservices.com) when a conversion occurs and may include the format for the request. For example, server 120 may instruct advertiser 130 to include a conversion tracking ID, value and label parameters, a key value and an HTTPS indicator in the request. The conversion tracking ID is the identifier provided to advertiser 130 at conversion tracking sign up time (act 610 or act 440). The value and label parameters are optional and have the same meaning as that described above with respect to FIG. 4. The key value includes the advertiser specific secret key and sequence number (provided to advertiser 130 at act 620). The HTTPS parameter determines if the HTML snippet that is to be provided to advertiser 130 results in an HTTP or HTTPS request that will be sent to conversion tracker 145 upon a conversion event. It should be understood that requests made via HTTP may be less secure than requests made via HTTPS.

Conversion tracker 145 may receive the HTTPS (or HTTP) request from advertiser 130 when a conversion occurs, as described in more detail below, and may generate the HTML snippet in a dynamic manner (i.e., upon receipt of the HTTP/HTTPS request). The HTML snippet provided to advertiser 130 may include a value and label that are passed to conversion tracker 145 along with a date and/or time, a globally unique identifier (GUID), a version, a sequence number and a hash value. The value parameter may be determined dynamically by advertiser 130 based on the type of conversion. For example, the value parameter may represent the value of a sale to advertiser 130. The label parameter may also be set dynamically by advertiser 130 to advertiser specific custom labels that differentiate types of conversions that may be used in a final report (e.g., "purchase," "registration," "mailing list signup," "page view," "download," etc.). The date/time will be the date that the request was received and may include the time in, for example, hours and minutes. The GUID may be an identifier that is essentially guaranteed to be globally unique. The GUID ensures that a hash value generated upon a conversion for each advertiser is also unique. The version identifies the version of the conversion request and may initially be set to one. The sequence number identifies the sequence number of the secret key that was used to generate the hash. The hash may be a hash value calculated using, for example, a hashed message authentication code-secure hash algorithm version 1.0 (HMAC-SHA1). The HMAC-SHA1 hash may hash a concatenation of the conversion tracking ID, value, label, date, GUID, version and sequence number. It should be understood that in alternative implementations, different hash algorithms may be used and different data may be used to generate the hash value.

The advertiser generated snippet may also include an image request in a similar manner as that described above with respect to FIG. 4. This snippet, when returned by conversion tracker 145 to advertiser 130, may be pasted by advertiser 130 into their post-conversion page. In addition, the content-type of the HTML snippet provided by conversion tracker 145 to advertiser 130 may be in text/html form and not compressed, such as zipped, gzipped, etc., to ensure that advertiser 130 can handle the HTML snippet.

As described above, the UI provided at act 610 may allow the advertiser (e.g., advertiser 130) to generate the snippet. For example, advertiser 130 may be unable to make HTTPS requests from their web server or may prefer to generate the snippet at their web site. In this case, assume that advertiser 130 selects advertiser generated snippet. Server 120 may then download code to advertiser 130 to facilitate generating the snippet dynamically upon a conversion (act 650). The code may be in any conventional language, such as active server page (ASP), java server page (JSP), hypertext preprocessor (PHP), or another language. In each case, advertiser 130 may store the code (act 650). In an exemplary implementation, the code may define two functions.

For example, the first function may be a convenience wrapper which hard codes the advertiser's conversion tracking ID, secret key and sequence number. The first function may then be called to avoid having to cut and paste the key and sequence number each time a GUID needs to be generated.

The second function may be the actual snippet generation function (e.g., GenerateConversionSnippet). The snippet generation function may generate a GUID, and a hash value in a similar manner as that described above for conversion tracker generated snippet. The snippet generation function may also include the same information in the snippet as that described above for conversion tracker generated snippet (i.e., date, GUID, version, hash, sequence number and an image request to conversion tracker 145 along with optional value and label fields). Similar to the discussion above with respect to the conversion tracker generated snippet option, the value and label parameters may be dynamically set based on the type of conversion and may be inputs to the function that generates the hash value.

Figure 7:
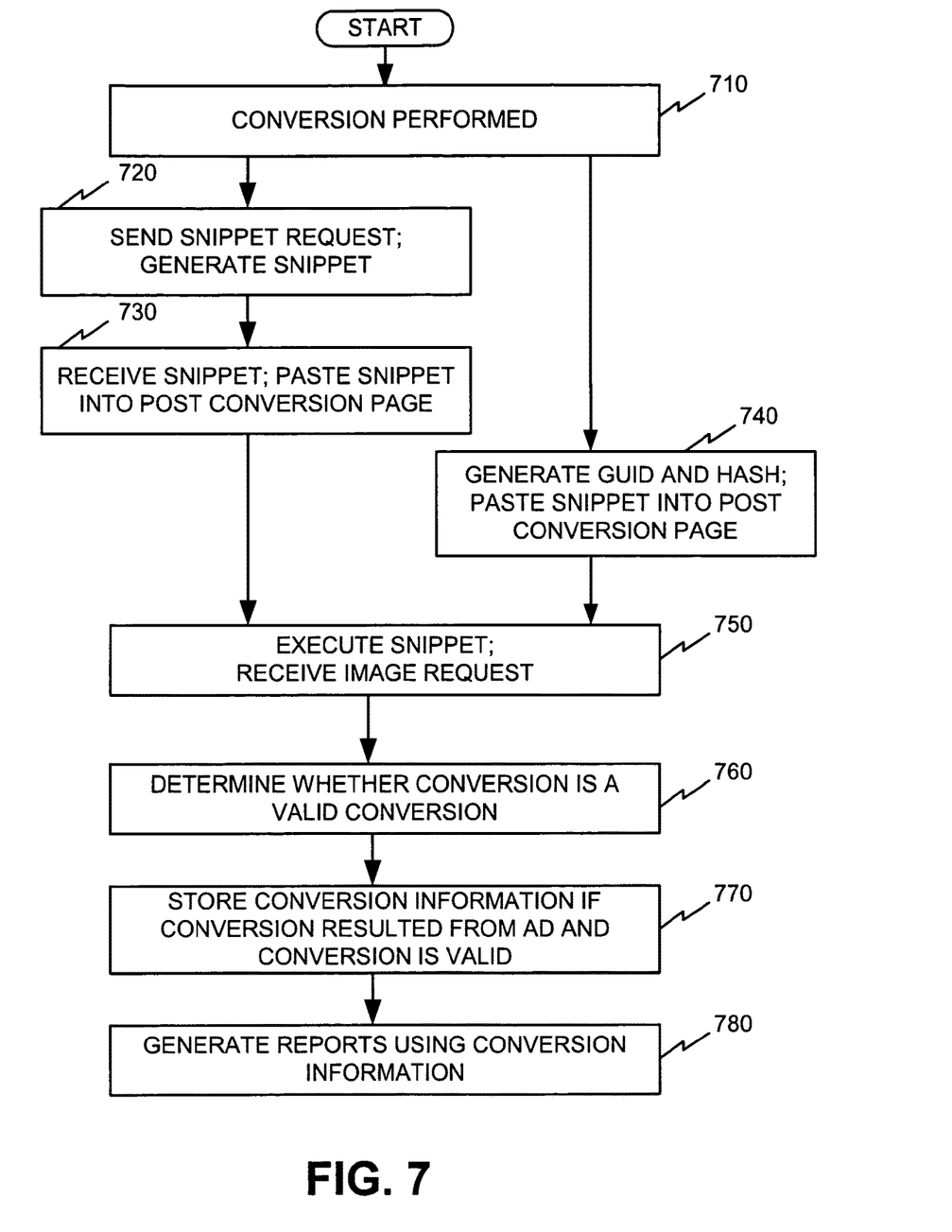
FIG. 7 is a flow diagram illustrating exemplary processing associated with secure conversion tracking in an implementation consistent with the principles of the invention.

FIG. 7 is a flow diagram illustrating exemplary processing associated with secure conversion tracking according to an implementation consistent with the principles of the invention. The processing described below uses the example of conversion tracking associated with ads that are provided based on search queries. However, as discussed above, the techniques described herein may be used in any system in which particular user actions are to be determined/identified.

Processing may begin with a client 110 accessing server 120 via network 150 and receiving a UI for entering a search query. Assume that the user enters a search query and transmits the search query to server 120. Server 120 receives the search query, executes the search and generates a list of search results.

Server 120 may also identify advertiser(s) based on the search query. For example, when server 120 receives a query, server 120 may determine whether any advertiser has purchased advertising associated with one or more terms in the search query. Server 120 may then identify the advertiser(s) associated with the query and the particular ads associated with the query. Server 120 may also transmit the search results and ad(s) to client 110 for display. The ads may include text and links to the respective advertisers' web sites.

Assume that a user, via client 110, performs an ad click on an ad associated with an advertiser that has enabled secure conversion tracking. For example, assume that advertiser 130 has enabled secure conversion tracking for a particular ad provided by server 120 and that a client 110 clicks on that particular ad. Further assume that client 110 performs an act defined by advertiser 130 to be a conversion for that particular ad (act 710).

As described previously, each advertiser may define what acts are considered conversions, such as a purchase, a registration, a page view, a sign-up, a download, etc. For example, when advertiser 130 receives credit card information transmitted by client 110 for purchasing a particular product, advertiser 130 may determine that a conversion has occurred.

As discussed above, implementations consistent with the invention may provide two options associated with secure conversion tracking (i.e., conversion tracker generated snippet and advertiser generated snippet). Assume that advertiser 130 has selected conversion tracker generated snippet. In this case, when a conversion event occurs, advertiser 130 sends an HTTPS (or HTTP) request to conversion tracker 145 (act 720).

As discussed above with respect to FIG. 6, the request may include the conversion tracking ID, value and label parameters, a key value and an HTTPS indicator. Conversion tracker 145 may then generate the snippet as described above with respect to FIG. 6 (act 720). That is, conversion tracker 145 may generate an HTML snippet that includes a date and/or time that the request was received, a GUID for this particular request, the version of the request (e.g. initially set to one), a sequence number and a hash value. To generate the hash, conversion tracker 145 may concatenate the conversion tracking ID, value, label, date, GUID, version and sequence number and calculate an HMAC-SHA1 hash from the resulting string.

The snippet may also include the conversion tracking ID, label and value parameters received with the request and an image/text request. The image/text request, as described above with respect to FIG. 5, will include a pointer to conversion tracker 145. Conversion tracker 145 then sends the snippet to advertiser 130. Advertiser 130 receives the snippet and pastes the snippet in advertiser 130's post conversion page (act 730).

It should be noted that the request from advertiser 130 may, but does not require authentication, e.g., by validation of its key. In some instances, not validating the request may actually provide increased security. For example, if an attacker made fake conversion requests to conversion tracker 145 with different keys, the attacker may look at the response to immediately determine if it guessed the advertiser's secret key correctly. While in practice it would be difficult for an attacker to guess the secret key, not validating the request from advertiser 130 may help prevent this possibility. In addition, validation may be unnecessary since a snippet generated based on a wrong key will later be invalidated when a hash is recomputed using the true key, as discussed in more detail below.

In the case where advertiser generated snippet was selected, advertiser 130 has already received and stored the code used to generate the snippet (FIG. 6, act 650). In this case, when a conversion occurs, advertiser 130 sends the appropriate inputs, such as the value and label parameters to the snippet generation function, which may then generate the GUID and the hash value using the same information as that described above for conversion tracker generated snippet (act 740). That is, advertiser calls the function GenerateConversionSnippet and generates a GUID for the snippet. The GUID, as described previously, is essentially a unique random number generated for each conversion. In one implementation, the code provided to advertiser 130 to generate the snippet may use, for example, a unique number associated with hardware (e.g., an Ethernet card) on advertiser 130's web site to generate the GUID. The function also calculates a hash value using an HMAC-SHA1 algorithm on the concatenated string representation of the conversion tracking ID, value, label, date, GUID, version and sequence number. After generating the snippet, advertiser 130 pastes the snippet into the appropriate post conversion page (act 740). It should be understood that typically advertiser 130 should make only one call to GenerateConversionSnippet per actual conversion. For example, if the user of client 110 unintentionally hits reload multiple times after performing a credit card transaction, advertiser 130 will typically only charge client 110 for one order (i.e., one credit card transaction). Similarly, advertiser 130 should only make one call to GenerateConversionSnippet per conversion event.

In either of the above cases (i.e., conversion tracker generated snippet or advertiser generated snippet), after a conversion occurs, advertiser 130 downloads the post conversion page to client 110. Client 110 receives the post conversion page and executes the snippet included in the post conversion page (act 750). The snippet, as described previously, may include a conversion tracking ID, a value, a label, a date, a GUID, a version, a hash, a sequence number and an image/text request. When the snippet is executed, client 110 sends the image/text request to conversion tracker 145 along with the other conversion information (i.e., date, GUID, version, hash, sequence number, value and label). The image/text request may also include the format for the image (assuming the request is an image request).

Conversion tracker 145 receives the image/text request along with the other conversion information (act 750). Conversion tracker 145 may then determine whether the conversion is an actual or valid conversion associated with advertiser 130, as opposed to either a fake conversion (e.g., spam) or a duplicate conversion that has already been counted (act 760).

For example, when conversion tracker 145 receives the image/text request, FE 310 may determine whether a cookie was received with the image/text request. For example, as discussed above with respect to respect to FIG. 5, FE 310 may set a cookie when an ad click occurs (FIG. 5, act 530). When a post conversion page is forwarded to client 110, client 110 may determine whether to send the cookie along with the image request. For example, as discussed above with respect to FIG. 5, if the conversion tracking ID included in the snippet matches a conversion tracking ID in a cookie stored on client 110, client 110 may send the cookie along with the image request. If conversion tracker 145 does not receive the cookie with the image request, this may indicate that the conversion did not result from a paid ad and conversion tracker 145 may drop the conversion. That is, conversion tracker 145 may not count this conversion as being a conversion associated with an ad provided to client 110. Conversion tracker 145, however, may provide an image to client 110 to let a party associated with client 110 know that some actions are being tracked. In this manner, conversion tracker 145 may use the cookie essentially as a first filter to determine if the conversion potentially resulted from an ad provided by server 120 in a similar manner as that described above with respect to FIG. 5.

Assuming that the conversion request was received with the appropriate cookie, FE 310 may forward the image/text request to ad mixer 320. Ad mixer 320 may generate a conversion event message (CEM) based on information included with the image/text request. The CEM may include a date and/or time corresponding to when ad mixer 320 received the image/text request. Ad mixer 320 may store the CEM in log processing module 330 based on an advertiser ID (e.g., conversion tracking ID). That is, the CEMs for a single advertiser may be stored together to facilitate processing the CEMs.

For each CEM, log processing module 330 may determine if the CEM version is less than one and whether the other fields associated with secure conversion tracking (e.g., GUID, hash, etc.) are present. If the version is less than one and/or other fields associated with secure conversion tracking are missing, the CEM may be associated with a non-secure request (e.g., a conversion such as those discussed above with respect to FIG. 5). If advertiser 130 has an active secret key (indicating that secure conversion tracking is enabled), the CEM may be rejected as an invalid conversion. If advertiser 130 does not have an active secret key (indicating that advertiser 130 has not enabled secure conversion tracking), the non-secure request may be accepted.

Log processing module 330 may also check whether the date included with the HTML snippet matches the date in the CEM (generated when ad mixer 320 received the image/text request). If these two dates do not match or are not within a predetermined range of each other, the request may be discarded. The predetermined range may be, for example, one day. This range or window allows conversion tracker 145 to deal with clock skew, conversions that occur around midnight, time zone differences, etc. In practice, the time associated with the CEM should normally be generated within several seconds of the date field time value.

Log processing module 330 may also recompute the hash using the appropriate secret key and information included in the CEM. That is, log processing module 330 may use advertiser 130's secret key to recompute the HMAC-SHA1 hash on the concatenated string including the conversion tracking ID, value, label, date, GUID, version and sequence number. If the recomputed hash value does not match the received hash value, this indicates that the hash was not generated using the advertiser 130's secret key and that the conversion may be spam. In this case, log processing module 330 may mark the CEM as being associated with an invalid conversion.

Log processing module 330 may also look at the GUID included with a CEM to determine whether a CEM with that same GUID has been received. If the GUID for a CEM matches a previous GUID included with another CEM, this indicates that the CEM may be a duplicate CEM that has already been counted as being associated with a valid conversion. For example, client 110 may have unintentionally (or intentionally) hit reload on their browser two or more times, which caused client 110 to transmit duplicate image/text requests. In this case, the GUIDs will be the same and log processing module 330 may mark the duplicate CEM as being associated with an invalid conversion. In some implementations, log processing module 330 may process received conversion event messages within, for example, three days of receipt. In this implementation, log processing module 330 may store a set of all GUIDs that have an incoming date that represents conversion events less than three days old. This may reduce storage requirements as compared to storing the set of all GUIDs that have been received over longer periods.

Log processing module 330 may also determine if the sequence number of the secret key is valid. For example, as discussed previously, if advertiser 130 loses its secret key, a new secret key with an incremented sequence number is provided. Log processing module 330 may ensure that once advertiser 130 upgrades to a sequence number of two, log processing module 330 will no longer accept conversions associated with sequence number of one. In some implementations, log processing module 330 may accept earlier sequence number keys for a short period (e.g., about one hour) after advertiser 130 upgrades to a new sequence number to take into account conversions that may have occurred prior to the key being lost/compromised.

In addition, log processing module 330 may store a "first seen time" record indicating the earliest time that a particular sequence number was used. That is, log processing module 330 may determine whether the CEM time-stamp for a particular sequence number indicates an earlier receive time than that currently stored as the first seen time for that sequence number. If the incoming CEM time-stamp represents an earlier time than currently stored for that sequence number, log processing module 330 may update the first seen time record for that sequence number. Updating the first seen time may be useful in some implementations since log processing module 330 may process events that are out of order with respect to time.

If the CEM passes the above tests, log processing module 330 accepts the conversion event as being an actual or valid conversion and not a spam conversion or duplicate conversion. Log processing module 330 may also write each CEM marked as a spam/duplicate conversion to a log for later analysis. This may allow conversion tracker 145 to detect problems with respect to security for an advertiser 130.

Assume that conversion tracker 145 determines that the conversion is valid. In this case, information associated with the conversion may be stored in an ad conversion log (act 770). The ad conversion log (not shown) may include records, such as a number of conversion events, a value associated with each conversion event, a label associated with each conversion event, a time associated with each conversion event, etc.

If conversion tracker 145 determines that the conversion was valid and resulted from an ad, FE 310 may return an image/text to client 110 that states, for example, "Thank you for shopping, some of your actions have been tracked for the merchant/seller." The image/text may also indicate the entity performing the conversion tracking and/or may also identify the ad provider associated with the conversion. Client 110 may then paste this image/text into the post conversion page displayed on client 110. Providing this information in the post conversion page allows clients 110 to be aware that some of their actions are being tracked. It should also be noted that the image/text sent back to client 110 may be displayed in a particular language that the user of client 110 will understand (e.g., English, Spanish, French, etc.) based on, for example, the geo-location of client 110. If conversion tracker 145 determines that the conversion is invalid, FE 310 may return a blank image or no image/text and client 110 will not receive any additional message on the post conversion page. Alternatively, FE 310 may return the same image as if a valid conversion occurred to let a party associated with client 110 know that some of its actions are being tracked.

Log processing module 330 may also generate various reports based on information in the ad conversion log (act 780). For example, log processing module 330 may generate a number of statistics for a particular advertiser. One statistic may be a conversion ratio associated with an ad. The conversion ratio may be based on a number of conversions that resulted from a displayed ad divided by the number of times the displayed ad was clicked at least once. By generating the conversion ratio, both advertisers and search engine providers may determine the effectiveness of the paid ads. Log processing module 330 may also determine a total value of all conversions over a period of time for a particular advertiser that resulted from ads from each ad provider, a value per click, etc.

Log processing module 330 may also analyze and generate reports based on invalid conversion information. For example, if the number of invalid conversions exceeds some predetermined threshold, this may indicate that an advertiser's site has been compromised by a hacker. More detailed analysis of both valid and invalid conversion information may also be made.

CONCLUSION

Implementations consistent with the principles of the invention provide secure conversion tracking with respect to advertisements.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4-7, the order of the acts may be varied in other implementations consistent with the present invention. Moreover, non-dependent acts may be implemented in parallel.

Also, implementations consistent with principles of the invention have been described with respect to generating hash values and using unique IDs to determine if a conversion is valid. In other implementations, other information may be used to detect valid/invalid conversions. For example, a public/private key signature system could be used to verify the validity of a conversion.

Lastly, implementations consistent with principles of the invention have been described as receiving an image request when a conversion occurred. The image request has been described as being transmitted by a client device when it receives a particular web page from an advertiser. In alternative implementations, the advertiser may transmit information directly to conversion tracker 145 indicating that a conversion occurred, along with other information, such as a hash value. In this case, advertiser 130 may not need to paste the snippet into a post conversion page to be executed by a client. In addition, in this implementation, "offline" conversions may be accounted for by conversion tracker 145.

For example, some advertisers may not determine whether a conversion event has occurred until well after an initial ad click occurred. As one example, a client 110 may receive an ad from advertiser 130 and a party associated with client 110 may sign up online to attend a sales conference or to meet with a sales representative associated with the advertiser 130. The actual sale or conversion, however, may occur at the meeting with the sales representative much later than the online sign-up occurred (e.g., one month or more later). In this case, advertiser 130 may report the conversion directly to conversion tracker 145 and the time delay between the initial sign-up and the actual conversion does not matter. That is, conversion tracker 145 will not look at any time stamps or dates associated with the initial contact (e.g., ad click or sign-up) when determining whether to count the conversion event as a valid conversion. In addition, the conversion event may be tied into advertiser 130's sales tracking software so that advertiser 130 may automatically report the conversion event to conversion tracker 145 once it has been entered by advertiser 130 as a sale/conversion.

In addition, in alternative implementations, conversion tracker 145 may not need to generate cookies to track the user's actions. That is, server 140 may store an indication that an ad click for a paid advertiser was received at a certain time. When server 140 receives a conversion indication from a particular advertiser, server 140 may correlate that conversion information to the stored ad click information to determine whether the conversion resulted from an ad. Further, in other implementations, other types of requests (other than image requests) or no image request may be received with a conversion indication. In each case, server 140 may return (or not return) the appropriate information. Conversion tracker 145, however, still receives information indicating that a conversion occurred.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" as used herein is intended to mean "based, at least in part, on" unless explicitly stated otherwise.

What is claimed is:

1. A method comprising:
receiving, by one or more processors, a request associated with a conversion event from an advertiser;
sending, using one or more processors, data to the advertiser comprising a first identifier and a first value generated based, at least in part, on a secret;
receiving, by one or more processors, a plurality of conversion requests;
generating, by one or more processors, a conversion event message for each of the plurality of conversion requests, each conversion event message comprising a second identifier and a second value generated based, at least in part, on the secret;
determining, by one or more processors, a first conversion request of the plurality of conversion requests is a valid conversion based on the first identifier matching the second identifier and the first value matching the second value; and
determining, by one or more processors, a second conversion request of the plurality of conversion requests is an invalid conversion based on one of:
the first identifier not matching the second identifier, or the first value not matching the second value.

2. The method of claim 1, wherein generating the conversion event message for each of the plurality of conversion requests comprises generating the second value based on the secret and one or more parameters included with a corresponding conversion request of the plurality of conversion requests.

3. The method of claim 2, wherein the one or more parameters comprises a value parameter, a label parameter, a time stamp parameter, the second identifier, a version parameter, or a sequence parameter.

4. The method of claim 1 further comprising:
storing, by one or more processors, the generated conversion event messages based on the second identifier.

5. The method of claim 1 further comprising:
detecting, by one or more processors, a duplicate conversion request of the plurality of conversion requests based on a third identifier of a second conversion event message matching the second identifier of a first conversion event message.

6. The method of claim 1 further comprising:
storing, by one or more processors, data for the first conversion request in a valid conversion log.

7. The method of claim 1 further comprising:
storing, by one or more processors, data for the second conversion request in an invalid conversion log.

8. The method of claim 1, wherein the secret is a random or pseudo-random generated string.

9. The method of claim 1, wherein the first value and the second value are hash values and the first identifier and the second identifier are globally unique identifiers.

10. The method of claim 1, wherein the received request associated with the conversion event from the advertiser comprises a value parameter, a label parameter, or the secret.

11. A system comprising:
one or more data processors; and one or more storage devices storing computer-executable instructions which, when executed by the one or more data processors, cause the one or more data processors to perform operations comprising:
receiving a request associated with a conversion event from a first device,
sending data to the first device comprising a first identifier and a first value generated based, at least in part, on a secret associated with the first device,
receiving a first conversion request comprising a second identifier and a second value,
generating a third value based, at least in part, on the secret and the second identifier of the received first conversion request, and
determining the first conversion request is an invalid conversion based on one of:
the first identifier not matching the second identifier, or
the generated third value not matching the second value.

12. The system of claim 11, wherein the one or more storage devices stores computer-executable instructions which cause the one or more data processors to perform operations further comprising:
receiving a second conversion request comprising the second identifier and a fourth value,
generating a fifth value based, at least in part, on the secret and the second identifier of the second received conversion request, and
detecting the conversion request as a valid conversion based on the first identifier matching the second identifier and the fifth value matching the fourth value.

13. The system of claim 11, wherein the data sent to the first device comprises a parameter, and wherein detecting the first conversion request as an invalid conversion is further based on the received first conversion request omitting the parameter.

14. The system of claim 11, wherein the first value and the second value are hash values and the first identifier and the second identifier are globally unique identifiers.

15. The system of claim 11, wherein the secret is a random or pseudo-random generated string.

16. The system of claim 11, wherein the secret is a private key.

17. The system of claim 11, wherein the received request associated with the conversion event from the advertiser comprises a value parameter, a label parameter, and the secret.

* * * * *